United States Patent
Adam

(10) Patent No.: US 8,646,977 B2
(45) Date of Patent: Feb. 11, 2014

(54) SLIDING ELEMENT AND METHOD FOR THE PRODUCTION THEREOF

(75) Inventor: Achim Adam, Nauheim (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 93 days.

(21) Appl. No.: 13/142,953

(22) PCT Filed: Dec. 28, 2009

(86) PCT No.: PCT/EP2009/067960
§ 371 (c)(1), (2), (4) Date: Sep. 27, 2011

(87) PCT Pub. No.: WO2010/076307
PCT Pub. Date: Jul. 8, 2010

(65) Prior Publication Data
US 2012/0008887 A1    Jan. 12, 2012

(30) Foreign Application Priority Data
Dec. 30, 2008 (DE) .................. 10 2008 055 195

(51) Int. Cl.
*F16C 33/04* (2006.01)
*B32B 15/08* (2006.01)

(52) U.S. Cl.
USPC ............. 384/42; 384/129; 384/279; 384/908; 384/913; 428/295.1

(58) Field of Classification Search
USPC ........... 384/42, 129, 276, 279, 297, 902, 908, 384/912–913; 428/297.1–297.4, 414, 553, 428/545, 550, 556, 295.1–295.7; 427/195
See application file for complete search history.

(56) References Cited

U.S. PATENT DOCUMENTS

| | | | | |
|---|---|---|---|---|
| 4,394,275 A | * | 7/1983 | Bickle et al. | 508/104 |
| 4,435,482 A | * | 3/1984 | Futamura et al. | 428/553 |
| 4,505,987 A | | 3/1985 | Yamada et al. | |
| 4,540,630 A | | 9/1985 | Wegner et al. | |
| 5,024,882 A | * | 6/1991 | Matucha et al. | 428/323 |
| 5,458,984 A | * | 10/1995 | Negwer | 427/456 |
| 5,948,479 A | | 9/1999 | Adam et al. | |
| 6,042,778 A | * | 3/2000 | Kraft et al. | 419/27 |
| 6,376,062 B1 | | 4/2002 | Adam | |
| 6,607,820 B2 | * | 8/2003 | Niwa et al. | 428/323 |
| 6,676,704 B1 | | 1/2004 | Pope | |
| 6,787,100 B2 | | 9/2004 | Toth | |
| 7,056,589 B2 | * | 6/2006 | Haupert et al. | 428/460 |
| 7,249,890 B2 | * | 7/2007 | Bickle et al. | 384/276 |

(Continued)

FOREIGN PATENT DOCUMENTS

| | | | | |
|---|---|---|---|---|
| DE | 4227909 A1 | * | 2/1994 | ............. B32B 15/08 |
| DE | 19963385 C1 | | 1/2001 | |

(Continued)

*Primary Examiner* — Marcus Charles
(74) *Attorney, Agent, or Firm* — Robert L. Stearns; Dickinson Wright, PLLC

(57) ABSTRACT

A sliding element comprises a metallic support layer, a metallic porous carrier layer applied thereon, and a sliding layer which has a thickness D applied on the carrier layer. The sliding layer comprises a first material containing a thermoplastic matrix and a second material containing PTFE. The second material is impregnated in the first material, which form a gradient over a depth T, where $T \leq D$ in a surface area of the sliding layer.

24 Claims, 1 Drawing Sheet

(56) References Cited

U.S. PATENT DOCUMENTS

| | | | |
|---|---|---|---|
| 8,267,589 B2 * | 9/2012 | Tsuji et al. | 384/276 |
| 2002/0037992 A1 * | 3/2002 | Niwa et al. | 528/189 |
| 2005/0042963 A1 | 2/2005 | Adam et al. | |
| 2005/0181194 A1 * | 8/2005 | Haupert et al. | 428/297.4 |
| 2007/0269674 A1 * | 11/2007 | Yanase et al. | 428/550 |
| 2008/0193324 A1 * | 8/2008 | Sato et al. | 420/470 |
| 2008/0226933 A1 * | 9/2008 | Bickle et al. | 428/545 |

FOREIGN PATENT DOCUMENTS

| | | | |
|---|---|---|---|
| DE | 69520456 T2 | 10/2001 | |
| DE | 10226264 B4 | 12/2003 | |
| DE | 602006000573 T2 | 3/2009 | |
| EP | 1541263A1 A1 | 6/2005 | |
| JP | 63024003A A | 2/1988 | |
| JP | 2002225164 A * | 8/2002 | F16C 33/20 |
| JP | 2005036819 A * | 2/2005 | F16C 33/12 |
| WO | WO 2005080810 A1 * | 9/2005 | F16C 33/12 |

* cited by examiner

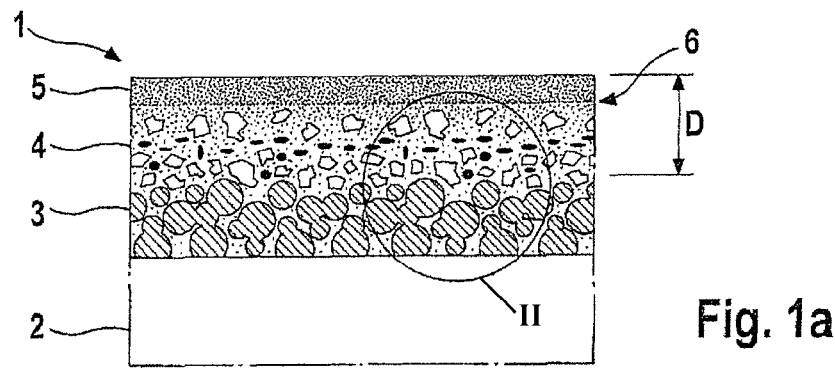
Fig. 1a
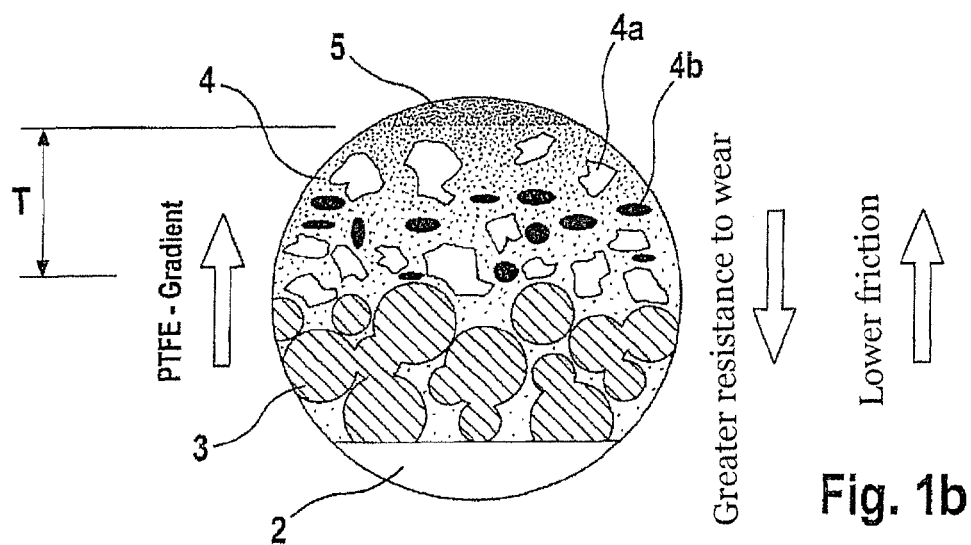
Fig. 1b
Fig. 2    Creation of gradient
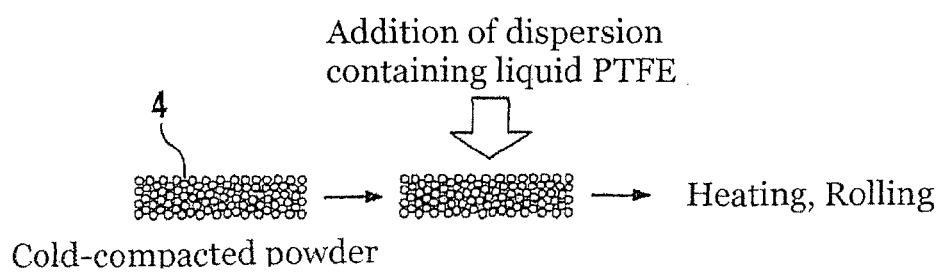

SLIDING ELEMENT AND METHOD FOR THE PRODUCTION THEREOF

CROSS-REFERENCE TO RELATED APPLICATIONS

This application is a 35 U.S.C. §371 U.S. National Stage patent application of International Patent Application No. PCT/EP2009/067960 filed Dec. 28, 2009; and claims priority to German Application No. 10 2008 055 195.3, filed Dec. 30, 2008.

BACKGROUND OF THE INVENTION

1. Technical Field

The invention refers to a sliding element with a metal supporting layer, with a porous metal carrier layer applied to it and with a sliding layer of thickness grade D applied to the carrier layer, which has at least one thermoplastic material as its matrix material. The invention also refers to a procedure for the manufacture of such sliding elements.

2. Related Art

Maintenance-free bearing materials mostly consist of multiple-layer materials with surfaces made of especially modified plastics. In a frequently used model, the composite materials have a porous metallic component, which is impregnated with a plastic compound, with which it is covered. It can be differentiated here between two types, depending on the matrix plastic: those based on PTFE and those based on thermoplastically processable plastics. The thermoplastic types are either provided with recesses in order to be able to accommodate a permanently acting quantity of lubricant or they are already used in the form of a compound modified with lubricants.

It has become evident that some of these types of materials with their plastic sliding surfaces can also be advantageously used as opposed to purely metal bearing materials in fluid-lubricated applications such as pumps or hydraulic shock absorbers due to their excellent adaptation and dirt absorbing properties and their high resistance to wear. In doing so, the PTFE based materials are characterised by a particularly low coefficient of friction for fluid lubrication, while thermoplastic materials can be highly resistant to wear. However, the thermoplastic materials have a clearly higher coefficient of friction for fluid lubrication, despite their modification.

Thermoplastic bearing materials have been used for many years in particularly wear-intensive fluid-lubricated applications such as described in the DE 32 21 785 C2. The friction bearing composite material is based on PEEK and has been modified with graphite, PTFE and carbon fibres. It is used, for example, in shock absorbers in which permanent stability is more important than a response characteristic with as low a friction value as possible, due to extreme stress.

DE 102 26 264 B4 describes a modified PEEK material with a high resistance to wear, especially developed for high temperatures. The friction bearing composite material has a supporting layer, if necessary a carrier layer and a sliding layer applied to the carrier layer or supporting layer, which has PEEK as the matrix material, a hardening component made of titanium dioxide and/or silicon carbide as well as a lubricant in the form of zinc sulphide and/or barium sulphate. However, the low coefficient of frictions of PTFE based materials for fluid lubrication cannot be achieved with this material.

In DE 198 08 540 84, materials on thermoplastic basis are described, which due to a relatively high PTFE content and the leaving aside of solid additives already have more favorable friction values that are however still clearly above those of PTFE based materials.

The quantity of the PTFE that can be added is limited, as too high a content weakens the thermoplastic matrix, which has a negative effect on the wear resistance of the material.

Two procedures for the manufacture of thermoplastic layers are mainly known:
a) Application of a powder mixture onto the metal substrate with subsequent melting and rolling, as described in the DE 32 21 785 C2.
b) Manufacture of a compound film to roll on to the metal substrate as described in the DE 102 26 364 B4.

The DE 195 07 045 C2 describes a composite material, for which a paste is applied for the manufacture of the sliding layer having a fluoropolymer e.g. made of PTFE. Other fluoropolymers such as PFA, FEP, ETFE are also provided for, either on their own or in combination.

PTFE layers can also be generated by means of the intermediate step of a film and application to the carrier material or by direct rolling on of an aqueous plastic compound on the basis of a PTFE dispersion, as described in the DE 195 07 042 C2.

SUMMARY OF THE INVENTION

The task of the invention is to provide a sliding element on thermoplastic basis with a coefficient of friction that is clearly improved in comparison with sliding elements with sliding layers made of thermoplastic materials for fluid lubrication.

This problem is solved with a sliding element with a metal supporting layer, with a porous metal carrier layer applied to it and with a sliding layer of thickness grade D applied to the carrier layer, which has at least one thermoplastic material as its matrix material, whereby the sliding layer has a first material containing the thermoplastic matrix and a second material containing PTFE, which forms a gradient in a surface area of the first material over a depth of $T \leq D$.

The gradient in a surface area of the sliding layer is understood to be a continuous reduction of the proportion of the second material within the first material from the surface of the sliding layer up to a certain penetration depth T in the sliding layer.

Due to the fact that the second material contains PTFE, a PTFE gradient is also formed due to the gradient formation, such that the sliding characteristic and the wear resistance of the sliding layer can be specifically adjusted. In doing so, the wear resistance rises with the increasing abrasion of the sliding layer because the PTFE proportion is reduced while the sliding characteristics simultaneously worsen slightly due to the reduction of the PTFE proportion in the sliding layer.

Hence, the sliding characteristics of the thermoplastic material can be clearly improved and adjusted in the desired manner for the service life of the friction bearing element via the selection of the second material that contains PTFE and via the proportion of PTFE in the second material.

During the service life of a sliding element, approx. 75% of the sliding layer is removed. So that the PTFE can have a positive influence on the sliding behaviour during the entire service life, T can be correspondingly adjusted. The depth is preferably $T = \leq 0.75 \cdot D$, in particular $\leq 0.5 \cdot D$.

The first material containing the thermoplastic material preferably has a pore structure at least partly filled by the second material.

As the volume of the pores of the pore structure is reduced with increasing depth, the gradient in the sliding layer can be adjusted in this way. The gradient is therefore defined via the pore structure.

The following are preferably provided as the thermoplastic matrix: PEEK (polyetheretherketone), PPS (polyphenylene sulphide), PVDF (polyvinylidene fluoride), PFA (poly(tetrafluoroethylene-co-perfluorovinyl alkyl ether)), ETFE (polyethylene-alt-tetrafluoroethylene), PPA (polyphthalamide), LCP (liquid-crystalline polymers), PES (polyethersulfone), PSU (polysulfone), PEI (polyetherimide) either individually or as mixtures.

The thermoplastic matrix can contain additives made of high-temperature thermoplastics, solid lubricants, hard materials and/or fibres.

The wear resistance can be further increased due to the addition of at least one high temperature thermoplastic.

The proportion of high temperature thermoplastics should preferably be 0.5 to 15% by volume related to the total volume of the first material. The advantage of these proportions of high temperature thermoplastics is that on the one hand a wear-reducing effect is created, while on the other hand the matrix compound is not weakened by too high additive quantities.

The following are preferably intended as high temperature thermoplastics: PPTA (poly-p-phenyleneterephthalamide), PPSO2 (polyphenylenesulfone), PPA (polyphthalamide), PI (polyamide), PAI (polyamideimide), PBI (polybenzimidazole), either individually or in combination.

The first material preferably contains 0-27.5% by volume of lubricants related to the total volume of the first material.

The proportion of solid lubricant is selected depending on the penetration depth that permits the pore structure. If the gradient for example can only reach to half the thickness of the sliding layer, then it is advantageous to elect a high proportion of solid lubricant, e.g. >15% by volume. This way, enough sliding properties are still available if the sliding layer is removed to such an extent that the PTFE gradient has disappeared.

The following solid lubricants are preferably used in the first material: (PTFE, $MoS_2$, $WS_2$, hBN (hexagonal boron nitride), Pb, PbO, ZnS, $BaSO_4$, graphite, either individually or in combination.

The first material preferably contains hard materials with a proportion of 0 to 10% by volume related to the total volume of the first material. Preferred hard materials are SiC, $Si_3N_4$, BC, cBN (cubic boron nitride), layered silicates or metal oxides such as $TiO_2$ or $Fe_2O_3$. The advantage of the addition of hard materials is that they can bring about a smoothing of the counter-member, which reduces its abrasiveness.

Furthermore, the first material can contain fibrous additives. These are preferably carbon fibres, aramid fibres and/or glass fibres. The quantity of the fibres can be between 0 and 10% by volume, preferably between 0 and 5% by volume related to the total volume of the first material.

The second material can consist entirely of PTFE or PTFE and an additive. In the second case, the proportion of PFTE is at least 70% related to the total volume of the second material.

The additive preferably has 0 to 20% by volume, in particular 1 to 20% by volume of PFA (poly(tetrafluoroethylene-co-perfluorovinyl alkyl ether)) related to the total volume of PTFE.

The addition of PFA has the advantage that the connection of the second material to the first is improved.

The additive can contain 0 to 100% by volume of solid lubricants, related to the total volume of the additive. The addition of solid lubricants as an additive to the second material is particularly done when the quantities of solid lubricant in the first material are chosen to be small. The solid lubricants are preferably PTFE, $MoS2$, $WS2$, hBN, Pb, ZnS, $BaSO4$ and/or graphite. Furthermore, the second material may have hard materials with a proportion of 0 to 10% by volume related to the total volume of the second material. Preferred hard materials are SiC, $Si3N4$, BC, cBN, layered silicates and/or metal oxides such as $TiO_2$ or $Fe_2O_3$.

The proportion of the second material in the total volume of the sliding layer depends on the one hand on the volume of the pore structure in the second material and on the other hand on the thickness of the surface layer that is developed by the second material and that protrudes beyond the material of the first material. This thickness d of the surface layer is preferably $0 \leq d \leq 15$ µm.

The procedure for the manufacture of such sliding elements includes the following procedural steps:
   Provision of a metal supporting layer with an applied porous metal carrier layer,
   Generation of a sliding layer on the metal carrier layer with the following steps:
      Spreading of a first material made of at least one powder mixture containing thermoplastic material,
      Compaction of the first material,
      Impregnation of the compacted first material with a dispersion of a second material containing PTFE,
      Melting of the sliding layer and
      Rolling of the sliding layer.

The compaction of the first material preferably takes place via cold compaction, carried out between a room temperature of 20° C. up to 100° C.

Due to the capillary effect of the pore structure in the cold-compacted powder layer, the dispersion soaks into the first material and a gradient of the dispersion arises and therefore a gradient of the PTFE concentration.

The dispersion of the second material is preferably a 25 to 55% aqueous PTFE dispersion.

As an alternative, the dispersion of the second material can consist of a first 25 to 55% aqueous PTFE dispersion and a second dispersion made of an additive.

The second dispersion preferably has a PFA dispersion. The second dispersion can consist exclusively of this PFA dispersion or can also contain solid lubricants and/or hard materials.

1 $m^2$ of the carrier layer is preferably impregnated with 5 g to 100 g of the dispersion of the second material.

The quantity of PTFE introduced to the sliding layer via the dispersion, can be varied within certain limits. In case of extremely small quantities, the friction-reducing effect is correspondingly reduced. Too large quantities of PTFE soften the cold-compacted powder layer, such that a compact layer can no longer be achieved after melting in the furnace. As a rule of thumb, approximately 5 g to 100 g, preferably 50 g PTFE (solid) should be applied to a square meter, ideally in the form of a 30 to 50% aqueous stable dispersion.

It is particularly preferred to select the quantities per square meter of the dispersion of the second material such that the PTFE proportion per square meter is 40 g to 60 g, in particular 45 g to 55 g.

It is planned to perform the impregnation with one of the following methods:
   Spraying with a nozzle,
   Transferring from a roller surface,
   Transferring by pressing on a sponge or roller,
   Spin-coating with a rotating plate,
   Screen printing method, Contact with a capillary metering system of the type brush with bristles, felt or fabric.

The sliding element is preferably a friction bearing element.

The sliding element according to the invention is particularly suitable for fluid-lubricated applications, especially in the field of shock absorbers and pumps.

THE DRAWINGS

Exemplary designs of the invention are explained below based on the drawings.

The following are shown:

FIG. 1a is a ground cross-sectional view of a sliding element according to the present invention, FIG. 1b is an enlarged view of encircled part II from the ground cross-sectional view of FIG. 1a, and FIG. 2 is a diagram of the manufacturing procedure.

DETAILED DESCRIPTION

FIG. 1a shows a diagram of a ground cross-sectional view of a sliding element, in particular of a friction bearing element 1, which has a steel supporting layer 2 and a porous bronze carrier layer 3 on top. A sliding layer 6 with a thickness D is applied to the bronze carrier layer, consisting of a first material 4 and a second material 5.

The first material 4 consists of a thermoplastic compound that has been impregnated with a second material 5 in the form of a dispersion containing PTFE. Due to the pore structure of the first material 4, the second material 5 containing PTFE can penetrate during the impregnation process and the gradient is then formed due to the pore structure.

In FIG. 1b an encircled part II of the ground cross-sectional view of FIG. 1a is enlarged when displayed. The different grey graduation in the top area indicates the impregnated area and hence the gradient. Not only within the first material 4 but also within the second material 5 there may be additional particles, which consist of lubricant particles 4b in the representation shown here and of high temperature thermoplastic particles 4a.

In accordance with FIG. 2, the powder of the first material is cold compacted and the liquid PTFE dispersion is subsequently added. After this the sliding layer material is heated and rolled.

The following first materials (all details in % by volume related to the total volume of the first material):
(a) PEEK, 20% PTFE
(b) PEEK, 10% graphite, 10% C-fibres, 5% zinc sulphide, 5% titanium oxide
(c) PEEK, 10% graphite, 10% C-fibres, 10% PTFE
(d) PVDF, 20% PTFE
(e) PPS, 15% PTFE, 5% polyamide Were combined with the following second materials (all details in % by volume compared to the total volume of the second material)
(1) 100% PTFE
(2) PTFE, 5% Fe$_2$O$_3$
(3) PTFE, 5% MoS2
(4) PTFE, 10% MoS2, 10% BN
(5) PTFE, 30% BN
(6) PTFE, 20% ZnS
(7) PTFE, 15% CaF2 to make a sliding layer 6.

The result of the pin/roller test with dripping oil lubrication at 0.5 m/s and 20 MPa specific load in contained in the following table:

| | | without impregnation | | with impregnation | | | |
|---|---|---|---|---|---|---|---|
| 1. Material | 2. Material(dispersion mixture) | COF after 1 h | Wear (µm) after 1 h | COF after 1 h | Wear (µm) after 1 h | COF after 2 h | Wear (µm) after 2 h |
| a | 1 | 0.085 | 5 | 0.056 | 13 | 0.065 | 20 |
| a | 3 | 0.085 | 5 | 0.058 | 11 | 0.066 | 17 |
| a | 6 | 0.085 | 5 | 0.061 | 11 | 0.069 | 15 |
| b | 1 | 0.125 | 3 | 0.087 | 9 | 0.094 | 14 |
| b | 7 | 0.11 | 3 | 0.083 | 6 | 0.09 | 9 |
| c | 1 | 0.11 | 2 | 0.07 | 7 | 0.081 | 11 |
| c | 4 | 0.06 | 2 | 0.078 | 5 | 0.081 | 8 |
| d | 1 | 0.06 | 10 | 0.044 | 20 | 0.052 | 30 |
| d | 5 | 0.06 | 10 | 0.05 | 12 | 0.06 | 20 |
| e | 1 | 0.07 | 5 | 0.046 | 16 | 0.049 | 22 |
| e | 2 | 0.07 | 5 | 0.056 | 5 | 0.06 | 8 |

COF designates the coefficient of friction.

The table shows that the sliding layer without impregnation shows a clearly lower degree of wear after an hour than the sliding layer with impregnation. However, the coefficient of friction is clearly below that of the non-impregnated material.

The invention claimed is:

1. Sliding element with a metal supporting layer, with a porous metal carrier layer applied to it and with a sliding layer of thickness D applied to the carrier layer, which has at least one thermoplastic material as its matrix material, wherein the sliding layer has a first material containing the thermoplastic matrix, and a second material containing PTFE, forming a gradient in a surface area of the first material over a depth T where T≤D.

2. Sliding element according to claim 1, wherein the depth T is ≤¾D.

3. Sliding element according to claim 1, wherein the first material has a pore structure that is at least partly filled by the second material.

4. Sliding element according to claim 3, wherein the volume of the pores of the pore structure is reduced upon increasing depth T.

5. Sliding element according to one of the claim 1, wherein the thermoplastic matrix contains one or more of PEEK, PPS, PA, PVDF, PFA, ETFE, PPA, LCP, PES, PSU, PEI, either individually or as a mixture.

6. Sliding element according to claim 1, wherein the thermoplastic matrix has an additive of at least one high temperature thermoplastic.

7. Sliding element according to claim 6, wherein the proportion of the high temperature thermoplastics is 0.5 to 15% by volume related to the total volume of the first material.

8. Sliding element according to claim 6 wherein the at least one high temperature thermoplastic is at least one of PPTA, PPSO2, PBA, PI, PAI, and PBI.

9. Sliding element according to claim 1 wherein the first material contains 0 to 27.5% by volume of at least one solid lubricant related to the total volume of the first material.

10. Sliding element according to claim 9, wherein the solid lubricants consist essentially of at least one of PTFE, MoS2, WS2, hBN, Pb, PbO, ZnS, BaSO4 and/or graphite.

11. Sliding element according to one of the claim 1 wherein the first material contains 0 to 10% by volume of at least one hard material related to the total volume of the first material.

12. Sliding element according to claim 11, wherein the hard materials consist essentially of at least one of SiC, Si3N4, BC, cBN, layered silicates and/or metal oxides.

13. Sliding element according to claim 12, wherein the metal oxides consist essentially of $TiO_2$ and/or $Fe_2O_3$.

14. Sliding element according to claim 1, wherein the first material contains 0 to 10% by volume of fibres related to the total volume of the first material.

15. Sliding element according to claim 14, wherein the first material contains 0.5 to 5% by volume of fibres related to the total volume of the first material.

16. Sliding element according to claim 14 wherein the fibres consist essentially of carbon fibres, aramid fibres and/or glass fibres.

17. Sliding element according to claim 1, wherein the second material consists of PTFE.

18. Sliding element according to claim 1, wherein second material consists of PTFE and an additive.

19. Sliding element according to claim 18, wherein the additive has 0 to 20% by volume of PFA related to the total volume of the PTFE.

20. Sliding element according to claim 18, wherein the additive has 0 to 100% by volume of solid lubricants related to the total volume of the additive.

21. Sliding element according to claim 20, wherein said solid lubricants consist essentially of at least one of PTFE, MoS2, WS2, hBN, Pb, PbO, ZnS, CaSO4, and graphite.

22. Sliding element according to claim 1, wherein the second material contains 0 to 10% by volume of at least one hard material related to the total volume of the second material.

23. Sliding element according to claim 22, wherein the hard materials consist essentially of at least one of SiC, Si3N4, BC, cBN, layered silicates and/or metal oxides.

24. Sliding element according to claim 23, wherein metal oxides consist of $TiO_2$ and/or $Fe_2O_3$.

* * * * *